United States Patent
Ogasawara et al.

(10) Patent No.: US 9,353,195 B2
(45) Date of Patent: May 31, 2016

(54) EMULSIFIER FOR EMULSION POLYMERIZATION AND EMULSION POLYMERIZATION METHOD USING SAME

(71) Applicant: Dai-Ichi Kogyo Seiyaku Co., Ltd., Kyoto-shi, Kyoto (JP)

(72) Inventors: Asako Ogasawara, Kyoto (JP); Masayuki Hashimoto, Kyoto (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 14/367,002

(22) PCT Filed: Dec. 12, 2012

(86) PCT No.: PCT/JP2012/007950
§ 371 (c)(1),
(2) Date: Sep. 16, 2014

(87) PCT Pub. No.: WO2013/094158
PCT Pub. Date: Jun. 27, 2013

(65) Prior Publication Data
US 2015/0038654 A1   Feb. 5, 2015

(30) Foreign Application Priority Data

Dec. 20, 2011 (JP) ................. 2011-278271
Jul. 11, 2012 (JP) ................. 2012-155785

(51) Int. Cl.
| | | |
|---|---|---|
| C08F 2/24 | (2006.01) | |
| C08G 65/26 | (2006.01) | |
| C08F 212/00 | (2006.01) | |
| C08F 2/26 | (2006.01) | |
| C08F 2/30 | (2006.01) | |
| C08F 212/08 | (2006.01) | |
| C08F 218/08 | (2006.01) | |
| C08F 220/14 | (2006.01) | |
| C08F 220/18 | (2006.01) | |
| C09D 133/10 | (2006.01) | |
| C08F 290/14 | (2006.01) | |

(52) U.S. Cl.
CPC ... *C08F 2/24* (2013.01); *C08F 2/26* (2013.01); *C08F 2/30* (2013.01); *C08F 212/00* (2013.01); *C08F 212/08* (2013.01); *C08F 218/08* (2013.01); *C08F 220/14* (2013.01); *C08F 220/18* (2013.01); *C08F 290/142* (2013.01); *C08G 65/2612* (2013.01); *C09D 133/10* (2013.01); *C08G 2650/58* (2013.01)

(58) Field of Classification Search
CPC ............ C08F 2/24; C08F 2/26; C08F 290/14; C08F 290/142; C08G 65/2612
USPC ....................................................... 525/534
See application file for complete search history.

(56) References Cited

U.S. PATENT DOCUMENTS

| | | | | |
|---|---|---|---|---|
| 4,680,358 A | * | 7/1987 | Yu .............................. | 526/292.9 |
| 4,814,514 A | * | 3/1989 | Yokota et al. ................. | 568/608 |
| 6,841,655 B1 | * | 1/2005 | Gota et al. .................... | 528/425 |
| 2004/0048963 A1 | * | 3/2004 | Sawada et al. ................ | 524/423 |
| 2009/0239958 A1 | * | 9/2009 | Sakanishi et al. ................. | 516/9 |
| 2011/0257326 A1 | * | 10/2011 | Jaunky et al. ................. | 524/539 |
| 2014/0249272 A1 | * | 9/2014 | Ogasawara et al. ........... | 524/819 |

FOREIGN PATENT DOCUMENTS

| | | |
|---|---|---|
| JP | 62-286528 | 12/1987 |
| JP | 63-12334 | 1/1988 |
| JP | 63-54927 | 3/1988 |
| JP | 63-77531 | 4/1988 |
| JP | 63-84625 | 4/1988 |
| JP | 63-319035 | 12/1988 |
| JP | 4-50204 | 2/1992 |
| JP | 2002-301353 | 10/2002 |

* cited by examiner

*Primary Examiner* — Mike M Dollinger
(74) *Attorney, Agent, or Firm* — Jordan and Hamburg LLP

(57) ABSTRACT

An emulsifier for emulsion polymerization includes a compound represented by the following general:

(I)

$$\begin{array}{c}R^1\\ \text{(aromatic ring)}\text{—O—}(A^1O)_l\text{—}\left[\begin{array}{c}CH_2O\text{—}Z\\ |\\ CH_2CHO\end{array}\right]_m\text{—}(A^2O)_n\text{—}X\\ (Y)_{1\sim3}\end{array}$$

X=H, —(CH$_2$)$_a$—SO$_3$M, —(CH$_2$)$_b$—COOM, —PO$_3$M$_2$,
—P(B)O$_2$M, or —CO—CH$_2$—CH(SO$_3$M)-COOM

Y=

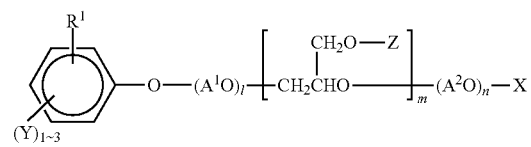

Z=

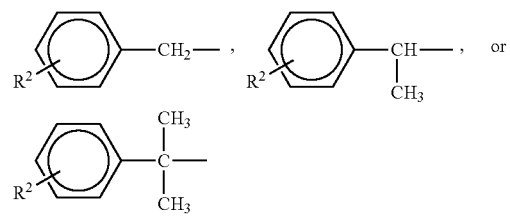

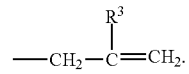

6 Claims, No Drawings

EMULSIFIER FOR EMULSION POLYMERIZATION AND EMULSION POLYMERIZATION METHOD USING SAME

TECHNICAL FIELD

The present invention relates to a reactive emulsifier which is used for emulsion polymerization process, a production method of a polymer dispersion using same, and a polymer dispersion obtained by the production method and a polymer film obtained from the polymer dispersion.

BACKGROUND ART

Conventionally, soaps; anionic surfactants such as sodium dodecylbenzenesulfonate, polyoxyethylene alkylphenyl ether sulfuric acid ester salts, polyoxyethylene aralkyl aryl ether sulfuric acid ester salts, polyoxyethylene alkyl ether sulfuric acid ester salts, etc.; and nonionic surfactants such as polyoxyethylene nonylphenyl ether, polyoxyethylene aralkyl aryl ethers, polyoxyethylene alkyl ethers, etc. have been utilized as an emulsifier for emulsion polymerization. However, in polymer films obtained from a polymer dispersion using such an emulsifier, the used emulsifier remains in a liberated state in the polymer film, and hence, there is involved such a problem that water resistance and adhesion of the film are inferior, or the like. Then, as remedial measures of the above-described problem, reactive emulsifiers having a copolymerizable unsaturated group have been proposed (for example, PTL 1 to PTL 3).

Though reactive emulsifiers having an acryl group or a methacryl group as a copolymerizable unsaturated group, which have been conventionally proposed, are excellent in copolymerizability with monomers, they encounter such a problem that polymerization stability at the time of emulsion polymerization is deteriorated. For example, there are involved such problems that a lot of agglomerates are produced during the emulsion polymerization; the formed particles are coarse; and stability with time is inferior, and the like. In addition, as for reactive emulsifiers having an allyl group as a copolymerizable unsaturated group, there may be the case where copolymerizability of the reactive emulsifier with monomers is inferior depending upon the monomer species or polymerization condition. Also, a problem that polymer films obtained from a polymer dispersion, which are thoroughly satisfactory in water resistance and adhesion, are not obtained; and a problem that a process trouble is caused due to foaming of a polymer dispersion remain. In particular, the above-described problems are often generated in the case where styrene is contained as a polymerizable unsaturated monomer at the time of emulsion polymerization, and it is eagerly demanded to solve these problems in the commercial production.

CITATION LIST

Patent Literature

PTL 1: JP-A-63-054927
PTL 2: JP-A-63-319035
PTL 3: JP-A-04-050204

SUMMARY OF INVENTION

Technical Problem

In view of the above-described circumstances, the present invention has been made and is aimed to provide a reactive emulsifier for emulsion polymerization, which is capable of making polymerization stability at the time of emulsion polymerization good, reducing foaming of a polymer dispersion to avoid a process trouble, and further conspicuously improving various properties of a polymer film obtained from a polymer dispersion, such as water resistance, adhesion, heat resistance, weather resistance, etc. In addition, in particular, the present invention is aimed to provide a reactive emulsifier for emulsion polymerization capable of conspicuously improving various properties of the resulting polymer dispersion even in the case of including styrene as a monomer, the matter of which is of a problem in the commercial production.

Solution to Problem

In order to solve the above-described problems, the present inventors made extensive and intensive investigations. As a result, it has been found that in particular, a reactive emulsifier having a limited copolymerizable unsaturated group in a limited addition molar number and having a specified group for a hydrophobic group is suited for emulsion polymerization, leading to accomplishment of the present invention.

Specifically, the emulsifier for emulsion polymerization of the present invention contains a compound represented by the following general formula (I).

[Chem. 1]

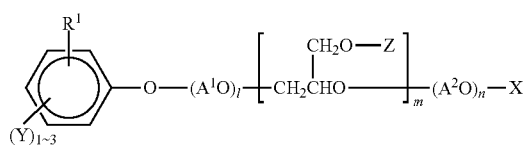
(I)

$X=H, -(CH_2)_a-SO_3M, -(CH_2)_b-COOM, -PO_3M_2,$
$-P(B)O_2M, or -CO-CH_2-CH(SO_3M)-COOM$

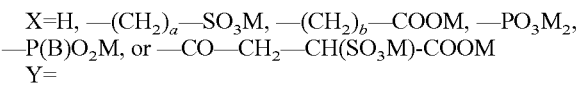

Y=

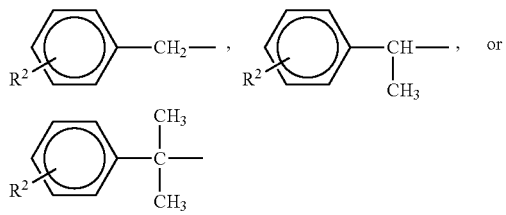

Z=

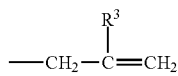

Here, in the general formula (I), $R^1$ represents an alkyl group having from 1 to 4 carbon atoms or a hydrogen atom; X represents a hydrogen atom or a group selected from anionic hydrophilic groups represented by the foregoing structural formulae, in these structural formulae, each of a and b represents a number of from 0 to 4, B represents a residue resulting from eliminating X from the general formula (I), and each M represents a hydrogen atom, an alkali metal atom, an alkaline earth metal atom, an ammonium group, or an alkanolamine residue; Y represents a group selected from substituents represented by the foregoing structural formulae, a substitution number of which is any one of from 1 to 3, and in the structural formulae representing these substituents, $R^2$ represents a hydrogen atom or a methyl group; Z represents a polymerizable unsaturated group represented by the foregoing structural formula, and in the structural formula representing this unsaturated group, $R^3$ represents a hydrogen atom or a methyl group; each of $A^1$ and $A^2$ represents an alkylene group or a substituted alkylene group each having from 2 to 4 carbon atoms, or a residue derived from an alkyl glycidyl ether or an alkenyl glycidyl ether each having from 4 to 22 carbon atoms; l represents a number in the range of from 0 to 5 as an average addition molar number of $A^1O$; m represents a number in the range of from 1 to 2; and n represents a number in the range of from 0 to 100.

It is preferable that the emulsifier for emulsion polymerization of the present invention contains a compound represented by the general formula (I), wherein X is —$SO_3M$; m represents a number in the range of from 1 to 2; l is 0; $A^2$ represents an ethylene group; and the average addition molar number n represents a number in the range of from 1 to 50.

Alternatively, it is preferable that the emulsifier for emulsion polymerization of the present invention contains a compound represented by the general formula (I), wherein X is —$SO_3M$; m represents a number in the range of from 1 to 2; $A^1$ represents a residue derived from an alkyl glycidyl ether represented by the following general formula (II); l represents a number in the range of from 1 to 2; $R^4$ represents a hydrocarbon group having from 6 to 19 carbon atoms; $A^2$ is an ethylene group; and the average addition molar number n represents a number in the range of from 1 to 50.

[Chem. 2]

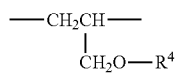

(II)

The emulsion polymerization method of the present invention is concerned with polymerization of a polymerizable unsaturated monomer including styrene by using any one of the emulsifiers for emulsion polymerization of the present invention.

Advantageous Effects of Invention

According to the present invention, it is possible to provide an emulsifier for emulsion polymerization, which is capable of making stability at the time of emulsion polymerization good regardless of the kind of a polymerizable unsaturated monomer to be used for emulsion polymerization and further conspicuously improving various properties of a polymer film obtained from a polymer dispersion, such as water resistance, adhesion, heat resistance, weather resistance, etc.

DESCRIPTION OF EMBODIMENTS

Modes for carrying out the present invention are hereunder described. The emulsifier for emulsion polymerization of the present invention is composed of a compound represented by the following general formula (I) (hereinafter also referred to as "compound (I)") having a nonionic or anionic hydrophilic group and, as a hydrophobic group, a phenol derivative having an aralkyl group as a substituent and further having a polymerizable unsaturated group in its molecular skeleton.

[Chem. 3]

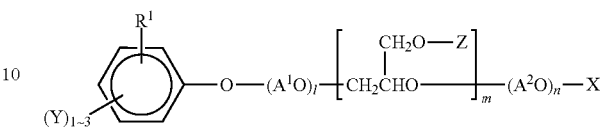

(I)

In the general formula (I), $R^1$ represents an alkyl group having from 1 to 4 carbon atoms; X represents a hydrogen atom or a hydrophilic group selected from —$(CH_2)_a$—$SO_3M$, —$(CH_2)_b$—COOM, —$PO_3M_2$, —$P(B)O_2M$, and —CO—$CH_2$—$CH(SO_3M)$-COOM; and in the foregoing formulae, each of a and b represents a number of from 0 to 4, B represents a residue resulting from eliminating X from the foregoing general formula (I), and each M represents a hydrogen atom, an alkali metal atom, an alkaline earth metal atom, an ammonium group, or an alkanolamine residue. In the present invention, in a more preferred embodiment of X, X is preferably composed of a hydrogen atom or —$(CH_2)_a$—$SO_3M$, and more preferably of —$SO_3M$ in which a is 0.

The compound of the general formula (I) has, as a hydrophobic group skeleton, a phenol derivative having an aralkyl group as a substituent. As a hydrophobic group raw material which is widely available as an industrial raw material, there can be exemplified styrenated phenol, benzyl phenol, cumyl phenol, styrenated cresol, and the like.

[Chem. 4]

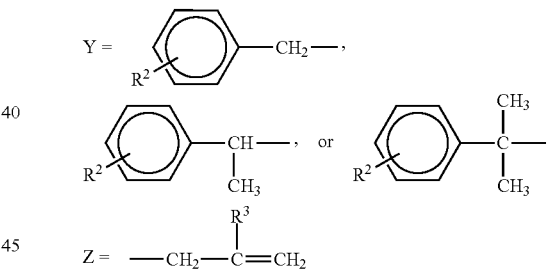

In the general formula (I), Y represents a group selected from substituents represented by the foregoing structural formulae; and $R^2$ represents a hydrogen atom or a methyl group. Z represents a polymerizable unsaturated group represented by the foregoing structural formula; $R^3$ represents a hydrogen atom or a methyl group; and in consequence, specifically, Z represents an allyl group or a methallyl group. This polyoxyalkylene skeleton including an allyl group or a methallyl group as Z is obtained by addition polymerization of allyl glycidyl ether or methallyl glycidyl ether. The addition molar number m of this oxyalkylene group including an allyl group or a methallyl group is a number of 1 or more and less than 3, preferably in the range of from 1 to 2, and more preferably in the range of from 1 to 1.5, as an average addition molar number. Depending upon the structure of other moiety of the compound (I), there is a concern that in the case where m is more than 2, polymerization stability during the emulsion polymerization is lowered, and a large amount of agglomerates are produced, resulting in causing a decrease of the solid content concentration.

In the general formula (I), each of $A^1$ and $A^2$ represents an alkylene group or a substituted alkylene group each having from 2 to 4 carbon atoms, or a residue derived from an alkyl glycidyl ether or an alkenyl glycidyl ether each having from 4 to 22 carbon atoms. In the case where $A^1$ or $A^2$ represents an alkylene group or a substituted alkylene group each having from 2 to 4 carbon atoms, $A^1O$ or $A^2O$ is a residue derived from ethylene oxide, propylene oxide, butylene oxide, or tetrahydrofuran (1,4-butylene oxide).

The alkyl glycidyl ether or alkenyl glycidyl ether each having from 4 to 22 carbon atoms can be selected from a glycidyl ether having a linear or branched alkyl group or alkenyl group and subjected to addition polymerization.

As the glycidyl ether having a linear or branched alkyl group or alkenyl group having from 4 to 22 carbon atoms, which is used in the present invention, known compounds can be utilized. These compounds may be one having a single composition, or two or more kinds of compounds can be selected and used as a mixture. As specific examples, the following compounds can be utilized. For example, there are exemplified butyl glycidyl ether, isobutyl glycidyl ether, tert-butyl glycidyl ether, 2-ethylhexyl glycidyl ether, octyl glycidyl ether, isononyl glycidyl ether, decyl glycidyl ether, isodecyl glycidyl ether, 2-propylheptyl glycidyl ether, undecyl glycidyl ether, dodecyl glycidyl ether, lauryl glycidyl ether, isotridecyl glycidyl ether, tetradecyl glycidyl ether, stearyl glycidyl ether, isostearyl glycidyl ether, oleyl glycidyl ether, behenyl glycidyl ether, and the like.

Besides, glycidyl ethers derived from EXXAL Series, manufactured by Exxon Mobil Corporation, that are a branched mixed saturated primary alcohol which is produced by an oxo process after going through a higher olefin derived from a mixture of propylene and butene; glycidyl ethers derived from NEODOL Series, manufactured by Shell Chemicals, or SAFOL Series or LIAL Series, manufactured by Sasol, Ltd., that are a mixed alcohol of linear type and branched type which is produced by an oxo process after going through an olefin derived from an n-paraffin or an ethylene oligomer; glycidyl ethers derived from FINEOXO-COL Series, manufactured by Nissan Chemical Industries, Ltd., that are a 2-alkyl-1-alkanol type; and the like are also an example of the glycidyl ether which can be suitably used.

In the general formula (I), l is in the range of from 0 to 5 as the average addition molar number of $A^1O$, and n is in the range of from 0 to 100 as the average addition molar number of $A^2O$. However, in the present invention, it is preferable that l is 0, and n is in the range of from 1 to 50.

In addition, in the formula (I), the polymerization mode of the $-(A^1O)_l-$ chain or $-(A^2O)_n-$ chain is not particularly limited, and each may be any of a homopolymer composed of a single kind of AO unit, or a random copolymer or a block adduct composed of two or more kinds of AO units, or a combination of those random adduct and block copolymer. However, an embodiment which is the most preferable in the present invention is the case where both of $A^1O$ and $A^2O$ are a single adduct of an oxyethylene group derived from ethylene oxide.

In addition, in the formula (I), in the case where l is in the range of from 1 to 5, the polymerization mode of the $-(A^1O)_l-$ chain or $-(A^2O)_n-$ chain is not particularly limited, and each may be any of a homopolymer composed of a single kind of AO unit, or a random copolymer or a block adduct composed of two or more kinds of AO units, or a combination of those random adduct and block copolymer. However, an embodiment which is the most preferable in the present invention is the case where both of $A^1O$ and $A^2O$ are a single adduct of an oxyethylene group derived from ethylene oxide.

In the general formula (I), the preferred embodiment of the present invention is one described above. Next, a series of steps of the production method of an emulsifier for emulsion polymerization of the present invention are hereunder described. A starting material of the compound (I) which is used for the emulsifier for emulsion polymerization of the present invention is one represented by the following general formula (III) (in the formula, $R^1$ and Y are the same as those described above). Specifically, phenol derivatives, styrenated phenol, benzyl phenol, cumyl alcohol, and the like, which are obtained by known methods as described above, or are commercially available as an industrial raw material, can be used. In addition, styrenated alkylphenol derivatives obtained by allowing a phenol compound substituted with an alkyl group having from 1 to 4 carbon atoms to react with styrene or o-, m- or p-methylstyrene according to the conventional procedure can be used.

[Chem. 5]

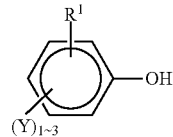

(III)

Next, the $-(A^1O)_l-$ chain and the $-(A^2O)_n-$ chain are obtained by subjecting an alkylene oxide, an alkyl glycidyl ether, or an alkenyl glycidyl ether, or else an allyl glycidyl ether having a polymerizable unsaturated group or a methallyl glycidyl ether having a polymerizable unsaturated group to addition polymerization by a known method. A catalyst which can be used is not particularly limited so long as it is useful for ring-opening reaction of an epoxy. Examples include tertiary amines, quaternary ammonium salts, boron trifluoride or its ether complex salts, aluminum chloride, barium oxide, sodium hydroxide, potassium hydroxide, and the like. In addition, as for the addition reaction condition of an alkylene oxide, a known condition can be utilized, too. In general, it is reacted at a temperature of from room temperature to 150° C. and under a pressure of from 0.01 to 1 MPa, and sodium hydroxide, potassium hydroxide, boron trifluoride or its ether complex salt or the like can be used as necessarily in the case where a catalyst is employed.

In addition, in the case where X in the general formula (I) is an anionic hydrophilic group, the compound obtained by the above-described method (compound in which X in the general formula (I) is a hydrogen atom) is further subjected to an introduction reaction with an anionic hydrophilic group.

In $-(CH_2)_a-SO_3M$ that is the formula representing the anionic hydrophilic group, though a reaction condition for introducing an anionic hydrophilic group in which "a" is 0 is not particularly limited, for example, the anionic hydrophilic group can be introduced by a reaction with sulfamic acid, sulfuric acid, sulfuric acid anhydride, fuming sulfuric acid, chlorosulfonic acid, or the like.

In addition, in $-(CH_2)_a-SO_3M$ that is the formula representing the anionic hydrophilic group, though a reaction condition for introducing an anionic hydrophilic group in which "a" is a number of from 1 to 4 is not particularly limited, either, for example, the anionic hydrophilic group can be introduced by a reaction with propane sultone, butane sultone, or the like.

In the formula representing the anionic hydrophilic group, a reaction condition for introducing an anionic hydrophilic group represented by —$(CH_2)_b$—COOM is not particularly limited, and the anionic hydrophilic group can be introduced, for example, by oxidation of a hydroxyl group, or a reaction with a monohalogenated acetic acid for carboxylation to occur, or a reaction with acrylonitrile or an acrylic acid ester, followed by saponification with an alkali.

In the formula representing the anionic hydrophilic group, a reaction condition for introducing an anionic hydrophilic group represented by —$PO_3M_2$ and/or —$P(B)O_2M$ (in the formula, B represents a residue resulting from eliminating X from the foregoing general formula (I)) is not particularly limited, and the anionic hydrophilic group can be introduced, for example, by a reaction with diphosphorus pentoxide, polyphosphoric acid, orthophosphoric acid, phosphorus oxychloride, or the like. In the case where the anionic hydrophilic group is a phosphoric acid ester group, a monoester type compound and a diester type compound are obtained as a mixture depending upon the production method, which compounds may be separated from each other, or may be used as the mixture as it is. In addition, these can also be used by allowing them to react with each other in the presence of water, thereby increasing a content proportion of the monoester compound.

In the formula representing the anionic hydrophilic group, a reaction condition for introducing an anionic group represented by —CO—$CH_2$—CH($SO_3M$)-COOM is not particularly limited, and the anionic hydrophilic group can be introduced, for example, by a monoesterification reaction with maleic anhydride, followed by a sulfonation reaction with anhydrous sodium sulfite. In addition, in the case of conducting anionic hydrophilization, the resultant may be subsequently neutralized with an alkali such as sodium hydroxide, potassium hydroxide, etc., ammonia, an alkylamine, or an alkanolamine such as monoethanolamine, diethanolamine, etc.

Next, with respect to an emulsion polymerization process using the reactive emulsifier of the present invention and an aqueous polymer dispersion and a polymer coating film obtained by the process, modes for carrying out the inventions are hereunder described. Incidentally, in the present specification, it should be construed that the polymer aqueous dispersion obtained by the emulsion polymerization method is generically called "polymer dispersion", and this also includes generally called polymer emulsions and polymer latexes as synonyms. In addition, the term "polymer film" refers to both a coating film in a state of being formed on a surface of a base material and a film having been separated from the base material.

(1) Polymerizable Unsaturated Monomer:

The polymerizable unsaturated monomer which is used in the present invention is not particularly limited, and examples of the polymerizable unsaturated monomer include acrylic acid esters such as methyl acrylate, ethyl acrylate, butyl acrylate, isobutyl acrylate, tert-butyl acrylate, pentyl acrylate, hexyl acrylate, cyclohexyl acrylate, heptyl acrylate, octyl acrylate, 2-ethylhexyl acrylate, nonyl acrylate, decyl acrylate, undecyl acrylate, lauryl acrylate, tridecylacrylate, stearylacrylate, 2-hydroxyethyl acrylate, hydroxypropyl acrylate, etc. In addition, examples of the polymerizable unsaturated monomer include methacrylic acid esters such as methyl methacrylate, ethyl methacrylate, propyl methacrylate, butyl methacrylate, isobutyl methacrylate, tert-butyl methacrylate, pentyl methacrylate, hexyl methacrylate, cyclohexyl methacrylate, heptyl methacrylate, octyl methacrylate, 2-ethylhexyl methacrylate, nonyl methacrylate, decyl methacrylate, undecyl methacrylate, lauryl methacrylate, tridecyl methacrylate, stearyl methacrylate, 2-hydroxyethyl methacrylate, hydroxypropyl methacrylate, glycidyl methacrylate, etc.; and besides, acrylonitrile, methacrylonitrile, acrylamide, methacrylamide, acrylic acid, methacrylic acid, and the like. In addition, examples of the polymerizable unsaturated monomer include aromatic monomers such as styrene, α-methylstyrene, vinyltoluene, dimethylstyrene, tert-butylstyrene, divinylbenzene, sodium styrenesulfonate, etc.; vinyl ester-based monomers such as vinyl acetate, VeoVa (registered trademark) 9 (vinyl neononanoate, manufactured by MOMENTIVE), VeoVa (registered trademark) 10 (vinyl neodecanoate, manufactured by MOMENTIVE), etc.; halogenated olefin monomers such as vinyl chloride, vinylidene chloride, vinyl fluoride, vinylidene fluoride, trichloroethylene, tetrafluoroethylene, 2-chloropropene, 2-fluoropropene, hexafluoropropene, etc.; conjugated diolefin-based monomers such as butadiene, isoprene, chloroprene, etc.; and besides, ethylene, maleic anhydride, methyl maleate, sodium vinylsulfonate, and the like. These monomers may be used solely, or may be used in combination of two or more kinds. As described later, in particular, usefulness of the present invention is high in the case of using a styrene-based monomer among the foregoing monomers.

(2) Emulsion Polymerization Method:

The emulsion polymerization method of the present invention is a method of conducting emulsion polymerization by blending the above-described emulsifier for emulsion polymerization of the present invention, and conditions other than this are not particularly limited. A known method which is properly selected from a batch polymerization method, a monomer dropping method, an emulsion dropping method, a seed polymerization method, a multi-stage polymerization method, a power feed polymerization method, and the like, these methods being classified based on a monomer feeding method, can be utilized.

In addition, in the above-described emulsion polymerization method, in order to contemplate to achieve enhancement of polymerization stability at the time of emulsion polymerization, enhancement of miscibility with a pigment or a filler in a post-process, enhancement of wettability with a base material, or the like, one or two or more kinds of general surfactants not having a radical-polymerizable group can also be used in combination within the range where the problem to be solved by the present invention is not adversely affected. Though the surfactant which is used in combination is not particularly limited, examples of the surfactant include nonionic surfactants such as polyoxyalkylene alkylphenyl ethers, polyoxyalkylene alkyl ethers, polyoxyalkylene styrenated phenyl ethers, polyoxyalkylene benzylated phenyl ethers, polyoxyalkylene cumylphenyl ethers, fatty acid polyethylene glycol ethers, polyoxyalkylene sorbitan fatty acid esters, sorbitan fatty acid esters, etc.; and anionic surfactants such as fatty acid soaps, rosin acid soaps, alkylsulfonic acid salts, alkylarylsulfonic acid salts, alkylsulfuric acid ester salts, alkylsulfosuccinic acid salts, and besides, sulfuric acid ester salts of the above-described nonionic surfactants having a polyoxyalkylene chain, phosphoric acid ester salts of the same, ether carboxylic acid salts of the same, sulfosuccinic acid salts of the same, and the like. In addition, examples of the surfactant include cationic surfactants such as a stearyl trimethyl ammonium salt, a cetyl trimethyl ammonium salt, a lauryl trimethyl ammonium salt, a dialkyldimethyl ammonium salt, an alkyl dimethyl benzyl ammonium salt, an alkyl dimethyl hydroxyethyl ammonium salt, etc.

Though the amount of the emulsifier which is used in the emulsion polymerization method of the present invention is not particularly limited, it is preferable to use the compound represented by the formula (I) in an amount of from 0.1 to 20 parts by mass based on 100 parts by mass of the total amount of the monomers. In addition, in the case where the above-described non-reactive emulsifier is used in combination, its use amount is preferably from 1 to 50 parts by mass based on 100 parts by mass of the compound represented by the formula (I).

In addition, for the purpose of enhancing polymerization stability at the time of emulsion polymerization, a known protective colloid agent can be used in combination. Examples of the protective colloid agent which can be used in combination include completely saponified polyvinyl alcohol (PVA), partially saponified PVA, hydroxyethyl cellulose, carboxymethyl cellulose, methyl cellulose, polyacrylic acid, polyvinylpyrrolidone, and the like.

In addition, the kind of a polymerization initiator which is used in the emulsion polymerization of the present invention and its addition amount are not particularly limited. However, persulfuric acid salts such as ammonium persulfate, potassium persulfate, etc. are desirable, and peroxides such as hydrogen peroxide, benzoyl peroxide, etc. can be used. In addition, if desired, a combination of a persulfuric acid salt with a reducing agent such as an alkali metal sulfite or bisulfite, etc. can also be used as a redox-based polymerization initiator capable of initiating the polymerization reaction at a low temperature.

In addition, if desired, a molecular weight modifier which is used in an emulsion polymerization process can be properly used within the range where the problem to be solved by the present invention is not adversely affected. As the molecular weight modifier, mercaptans such as n-dodecyl mercaptan, octyl mercaptan, tert-butyl mercaptan, thioglycolic acid, thiomalic acid, thiosalicylic acid, etc.; sulfides such as diisopropyl xanthogen disulfide, diethyl xanthogen disulfide, diethylthiuram disulfide, etc.; halogenated hydrocarbons such as iodoform, etc.; diphenylethylene, p-chlorodiphenylethylene, p-cyanodiphenylethylene, α-methylstyrene dimer, and the like can be used.

(3) Utilization of Polymer Dispersion:

The polymer obtained by the above-described emulsion polymerization method is used as a coating material or adhesive for forming a coating film, or for recovering a solid polymer with a precipitating agent according to the conventional procedure. That is, the resulting polymer dispersion is dried at normal temperature or by heating, if desired, whereby a polymer film is obtained. In addition, the solid polymer can be recovered also as follows: an acid or salt which has hitherto been used as the precipitating agent for recovery of a solid polymer is added, and the mixture is stirred to agglomerate a polymer, and then subjected to filtration or the like.

(4) Action of the Emulsifier for Emulsion Polymerization of the Present Invention:

As described above, the emulsifier for emulsion polymerization of the present invention is a polymerizable reactive emulsifier having a copolymerizable unsaturated group in its molecule, and in view of the fact that the emulsifier has a structure which is particularly restricted in the present invention, it has such advantages that it is excellent in copolymerizability with polymerizable monomers, particularly styrene-based monomers; and that it is easily incorporated into a polymer composition. In consequence, the amount of the emulsifier that exists in a liberated state in the polymer film obtained from the polymer dispersion is conspicuously reduced, and the emulsifier exhibits extremely excellent effects for enhancing various properties of the film, such as water resistance, adhesion, heat resistance, weather resistance, etc. Also, inhibition of foaming, mechanical stability, and the like of the polymer dispersion are conspicuously improved.

EXAMPLES

The present invention is hereunder described in more detail by reference to the following Examples, but it should not be construed that the present invention is limited to these Examples. Incidentally, the terms "parts" and "%" and other proportions are on a mass basis unless otherwise indicated. In addition, in the structural formulae, EO represents an oxyethylene group.

1. Preparation of Emulsifier for Emulsion Polymerization:

Production Example A1

In a temperature regulator-equipped autoclave provided with a stirrer, a thermometer, a nitrogen introducing pipe, an introduction pipe for raw material charging, and an exhaust pipe for pressure reduction, 636 g (2.0 moles) of styrenated phenol (mono/di/tri mass ratio=15/55/30) and 10 g of potassium hydroxide as a catalyst were charged; the atmosphere within the autoclave was purged with nitrogen; the temperature was increased to 100° C. under a reduced pressure condition; the reaction was then conducted while successively introducing 132 g (3.0 moles) of ethylene oxide under a condition at a pressure of 0.15 MPa and a temperature of 120° C.; 342 g (3.0 moles) of allyl glycidyl ether was then introduced into the autoclave at a temperature of 100° C.; and the reaction was conducted for 5 hours while continuing stirring. Subsequently, 1,760 g (40 moles) of ethylene oxide was successively introduced under a condition at a pressure of 0.15 MPa and a temperature of 130° C. to conduct the reaction, thereby obtaining Compound [A1] according to the present invention, which is represented by the following formula.

[Chem. 6]

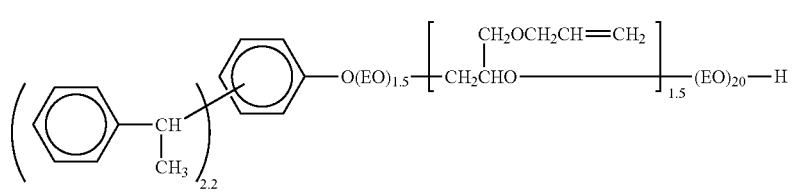

Production Example A2

In a temperature regulator-equipped autoclave provided with a stirrer, a thermometer, a nitrogen introducing pipe, an introduction pipe for raw material charging, and an exhaust pipe for pressure reduction, 636 g (2.0 moles) of styrenated phenol (mono/di/tri mass ratio=15/55/30) and 10 g of potassium hydroxide as a catalyst were charged; the atmosphere within the autoclave was purged with nitrogen; the temperature was increased to 100° C. under a reduced pressure condition; 342 g (3.0 moles) of allyl glycidyl ether was then introduced into the autoclave; and the reaction was conducted for 5 hours while continuing stirring. Subsequently, 880 g (20 moles) of ethylene oxide was successively introduced under a condition at a pressure of 0.15 MPa and a temperature of 130° C. to conduct the reaction, followed by neutralization with acetic acid, thereby obtaining Intermediate (A) [Compound [A2]] represented by the following formula.

Production Example A4

In a temperature regulator-equipped autoclave provided with a stirrer, a thermometer, a nitrogen introducing pipe, an introduction pipe for raw material charging, and an exhaust pipe for pressure reduction, 566 g (2.0 moles) of benzylated phenol (mono/di/tri mass ratio=15/60/25) and 10 g of potassium hydroxide as a catalyst were charged; the atmosphere within the autoclave was purged with nitrogen; the temperature was increased to 100° C. under a reduced pressure con-

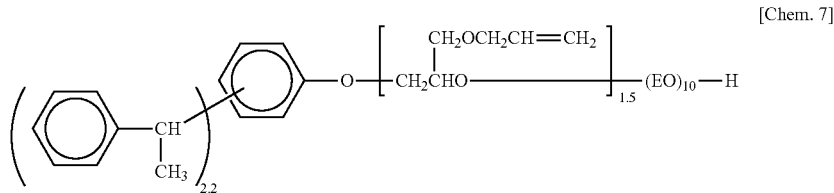

[Chem. 7]

Subsequently, 895 g of Intermediate (A) was charged in a reactor provided with a stirrer, a thermometer, and a nitrogen introducing pipe; the atmosphere within the reactor was purged with nitrogen; and 97 g of sulfamic acid was then allowed to react under a condition at a temperature of 120° C., followed by purification, thereby obtaining Compound [A3] according to the present invention, which is represented by the following formula.

dition; 274 g (2.4 moles) of allyl glycidyl ether was then introduced into the autoclave; and the reaction was conducted for 5 hours while continuing stirring. Subsequently, 880 g (20 moles) of ethylene oxide was successively introduced under a condition at a pressure of 0.15 MPa and a temperature of 130° C. to conduct the reaction, followed by neutralization with acetic acid, thereby obtaining Intermediate (B). Subsequently, 860 g of Intermediate (B) was charged in a reactor

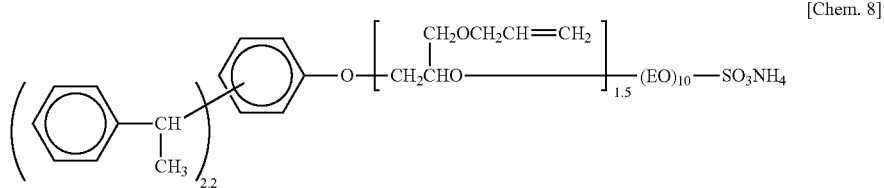

[Chem. 8]

Production Example A3

Compound [A4] according to the present invention, which is represented by the following formula, was obtained according to the production condition described in Production Example A2, except for changing the amount of ethylene oxide introduced from 880 g to 1,760 g (corresponding to 40 moles).

provided with a stirrer, a thermometer, and a nitrogen introducing pipe; the atmosphere within the reactor was purged with nitrogen; and 97 g of sulfamic acid was then allowed to react under a condition at a temperature of 120° C., followed by purification, thereby obtaining Compound [A5] according to the present invention, which is represented by the following formula.

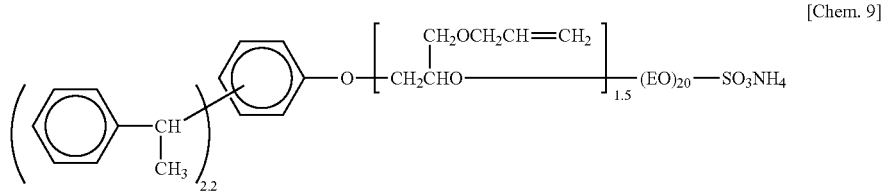

[Chem. 9]

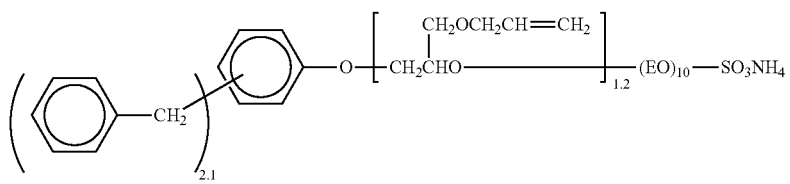

Production Example A5

In a temperature regulator-equipped autoclave provided with a stirrer, a thermometer, a nitrogen introducing pipe, an introduction pipe for raw material charging, and an exhaust pipe for pressure reduction, 425 g (2.0 moles) of cumyl phenol and 10 g of potassium hydroxide as a catalyst were charged; the atmosphere within the autoclave was purged with nitrogen; the temperature was increased to 100° C. under a reduced pressure condition; 256 g (2.4 moles) of methallyl glycidyl ether was then introduced into the autoclave; and the reaction was conducted for 5 hours while continuing stirring. Subsequently, 880 g (20 moles) of ethylene oxide was successively introduced under a condition at a pressure of 0.15 MPa and a temperature of 130° C. to conduct the reaction, followed by neutralization with acetic acid, thereby obtaining Intermediate (C). Subsequently, 781 g of Intermediate (C) was charged in a reactor provided with a stirrer, a thermometer, and a nitrogen introducing pipe; the atmosphere within the reactor was purged with nitrogen; and 97 g of sulfamic acid was then allowed to react under a condition at a temperature of 120° C., followed by purification, thereby obtaining Compound [A6] according to the present invention, which is represented by the following formula.

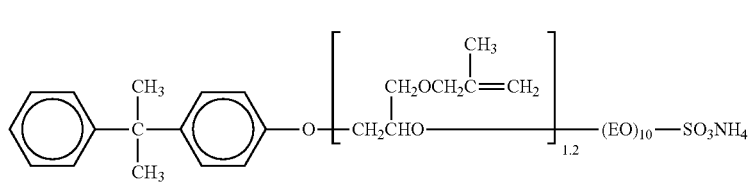

Production Example A6

In a glass-made reactor provided with a stirrer, a thermometer, and a nitrogen introducing pipe, 895 g (1.0 mole) of Intermediate (A) obtained in Production Example A2 was charged; 94 g (0.33 moles) of phosphoric acid anhydride was charged; and phosphorylation was conducted with stirring at 80° C. for 5 hours, followed by neutralization with caustic soda, thereby obtaining Compound [A7] according to the present invention, which is represented by the following formula. Incidentally, the present composition was confirmed by NMR and found to have a monoester/diester ratio of 57/43.

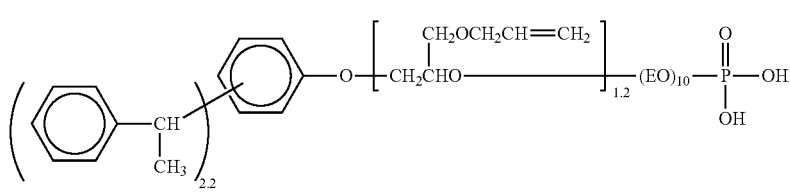

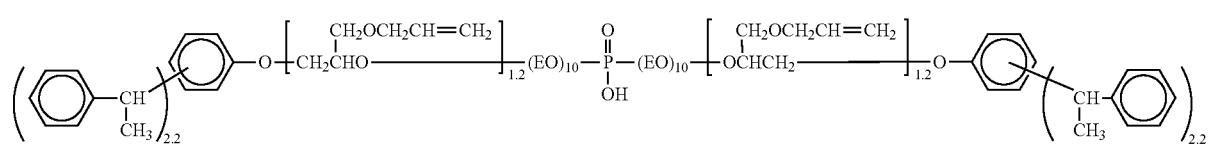

Production Example A7

In a temperature regulator-equipped autoclave provided with a stirrer, a thermometer, a nitrogen introducing pipe, an introduction pipe for raw material charging, and an exhaust pipe for pressure reduction, 470 g (2.0 moles) of styrenated phenol (mono/di/tri mass ratio=70/25/5) and 10 g of potassium hydroxide as a catalyst were charged; the atmosphere within the autoclave was purged with nitrogen; the temperature was increased to 100° C. under a reduced pressure condition; 431 g (2.0 moles) of 2-ethylhexyl glycidyl ether was then introduced; the reaction was conducted with stirring for 5 hours; subsequently, 274 g (2.4 moles) of allyl glycidyl ether was introduced into the autoclave; and the reaction was conducted for 5 hours while continuing stirring. Subsequently, 880 g (20 moles) of ethylene oxide was successively introduced under a condition at a pressure of 0.15 MPa and a temperature of 130° C. to conduct the reaction, followed by neutralization with acetic acid, thereby obtaining Intermediate (D). Subsequently, 1,028 g of Intermediate (D) was charged in a reactor provided with a stirrer, a thermometer, and a nitrogen introducing pipe; the atmosphere within the reactor was purged with nitrogen; and 97 g of sulfamic acid was allowed to react under a condition at a temperature of 120° C., followed by purification, thereby obtaining Compound [A8] according to the present invention, which is represented by the following formula.

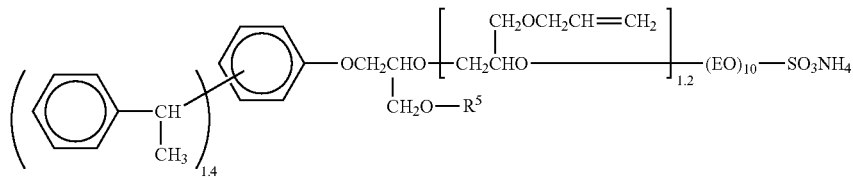

$R^5$ = 2-ethylhexyl group

Production Example A8

Compound [A9] according to the present invention, which is represented by the following formula, was obtained according to the production condition described in Production Example A2, except for changing the amount of allyl glycidyl ether introduced from 342 g (corresponding to 3.0 moles) to 228 g (corresponding to 2.0 moles).

[Chem. 14]

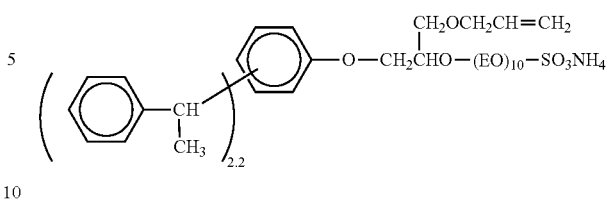

Production Example B1

In a temperature regulator-equipped autoclave provided with a stirrer, a thermometer, a nitrogen introducing pipe, an introduction pipe for raw material charging, and an exhaust pipe for pressure reduction, 630 g (2.0 moles) of styrenated methylphenol and 10 g of potassium hydroxide as a catalyst were charged; the atmosphere within the autoclave was purged with nitrogen; the temperature was increased to 100° C. under a reduced pressure condition; the reaction was then conducted while successively introducing 132 g (3.0 moles) of ethylene oxide under a condition at a pressure of 0.15 MPa and a temperature of 120° C.; 342 g (3.0 moles) of allyl glycidyl ether was then introduced into the autoclave at a temperature of 100° C.; and the reaction was conducted for 5 hours while continuing stirring. Subsequently, 1,760 g (40 moles) of ethylene oxide was successively introduced under a condition at a pressure of 0.15 MPa and a temperature of 130° C. to conduct the reaction, thereby obtaining Compound [B1] according to the present invention, which is represented by the following formula.

[Chem. 15]

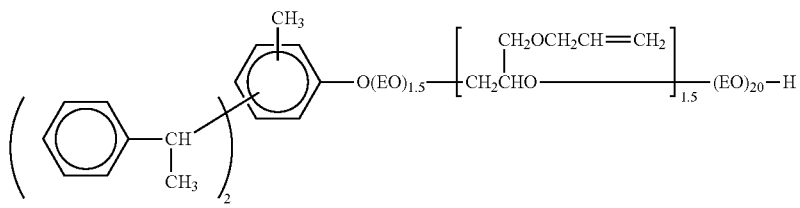

Production Example B2

In a temperature regulator-equipped autoclave provided with a stirrer, a thermometer, a nitrogen introducing pipe, an introduction pipe for raw material charging, and an exhaust pipe for pressure reduction, 630 g (2.0 moles) of styrenated methylphenol and 10 g of potassium hydroxide as a catalyst were charged; the atmosphere within the autoclave was purged with nitrogen; the temperature was increased to 100° C. under a reduced pressure condition; 342 g (3.0 moles) of allyl glycidyl ether was then introduced into the autoclave; and the reaction was conducted for 5 hours while continuing stirring. Subsequently, 880 g (20 moles) of ethylene oxide was successively introduced under a condition at a pressure of 0.15 MPa and a temperature of 130° C. to conduct the reaction, followed by neutralization with acetic acid, thereby obtaining Compound [B2] according to the present invention, which is represented by the following formula.

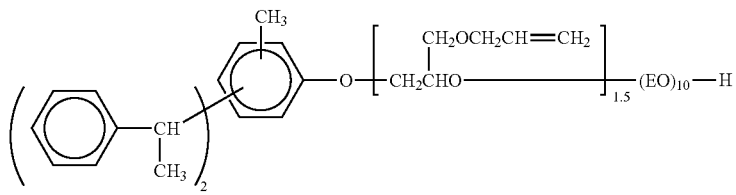

[Chem. 16]

Production Method B3

In a reactor provided with a stirrer, a thermometer, and a nitrogen introducing pipe, 927 g of Compound [B2] obtained in the above-described Production Example B2 was charged; the atmosphere within the reactor was purged with nitrogen; and 97 g of sulfamic acid was then allowed to react under a condition at a temperature of 120° C., followed by purification, thereby obtaining Compound [B3] according to the present invention, which is represented by the following formula.

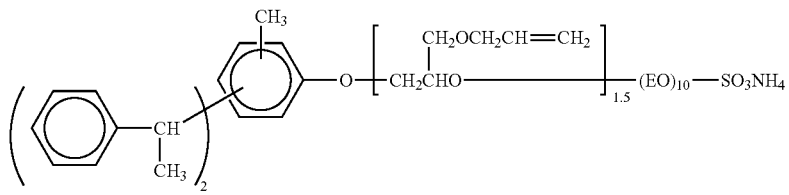

[Chem. 17]

Production Example B4

Compound [B4] according to the present invention, which is represented by the following formula, was obtained according to the production conditions described in Production Example B2 and Production Example B3, except for changing the amount of allyl glycidyl ether from 342 g to 274 g (corresponding to 2.4 moles) and also changing the amount of ethylene oxide introduced from 880 g to 1,760 g (corresponding to 40 moles).

[Chem. 18]

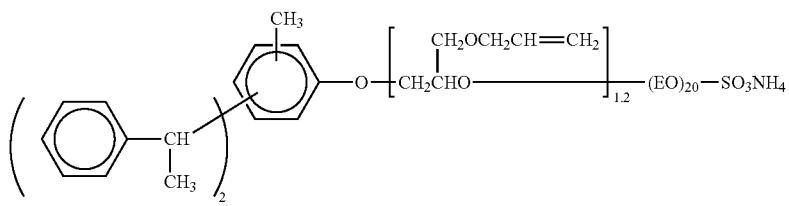

Production Example B5

In a reactor provided with a stirrer, a thermometer, and a nitrogen introducing pipe, 927 g of Compound [B2] obtained in the above-described Production Example B2 was charged; 94 g (0.33 moles) of phosphoric acid anhydride was charged; and phosphorylation was conducted with stirring at 80° C. for 5 hours, followed by neutralization with caustic soda, thereby obtaining Invention Product [B5], which is represented by the following formula. Incidentally, the present composition was confirmed by NMR and found to have a monoester/diester ratio of 57/43.

C. under a reduced pressure condition; 431 g (2.0 moles) of 2-ethylhexyl glycidyl ether was then introduced; the reaction was conducted with stirring for 5 hours; subsequently, 274 g (2.4 moles) of allyl glycidyl ether was introduced into the autoclave; and the reaction was conducted for 5 hours while continuing stirring. Subsequently, 880 g (20 moles) of ethylene oxide was successively introduced under a condition at a pressure of 0.15 MPa and a temperature of 130° C. to conduct the reaction, followed by neutralization with acetic acid, thereby obtaining Intermediate (E). Subsequently, 1,085 g of

[Chem. 19]

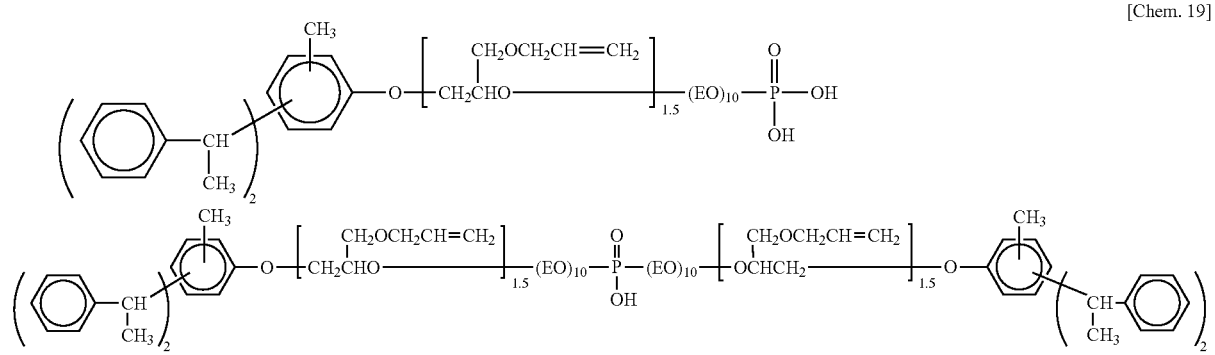

Production Example B6

In a temperature regulator-equipped autoclave provided with a stirrer, a thermometer, a nitrogen introducing pipe, an introduction pipe for raw material charging, and an exhaust pipe for pressure reduction, 468 g (2.0 moles) of styrenated methylphenol and 10 g of potassium hydroxide as a catalyst were charged; the atmosphere within the autoclave was purged with nitrogen; the temperature was increased to 100°

Intermediate (E) was charged in a reactor provided with a stirrer, a thermometer, and a nitrogen introducing pipe; the atmosphere within the reactor was purged with nitrogen; and 97 g of sulfamic acid was allowed to react under a condition at a temperature of 120° C., followed by purification, thereby obtaining Compound [B6] according to the present invention, which is represented by the following formula.

[Chem. 20]

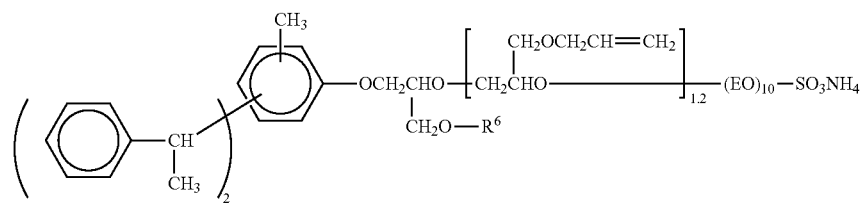

$R^6$ = 2-ethylhxyl group

Production Example B7

Compound [B7] according to the present invention, which is represented by the following formula, was obtained according to the production conditions described in Production Example B2 and Production Example B3, except for changing the raw material from styrenated methylphenol to methylstyrenated methylphenol.

[Chem. 21]

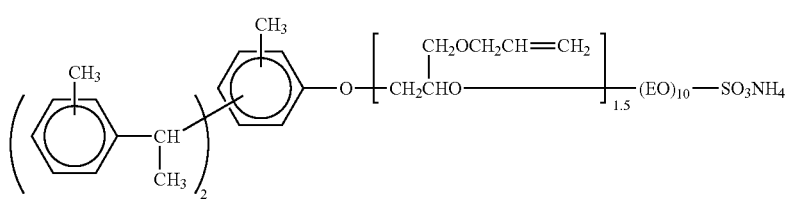

Production Example B8

Compound [B8] according to the present invention, which is represented by the following formula, was obtained by allowing 880 g (2.0 moles) of ethylene oxide to react according to the production conditions described in Production Example B2 and Production Example B3, except for changing the amount of allyl glycidyl ether from 342 g to 228 g (corresponding to 2.0 moles).

[Chem. 22]

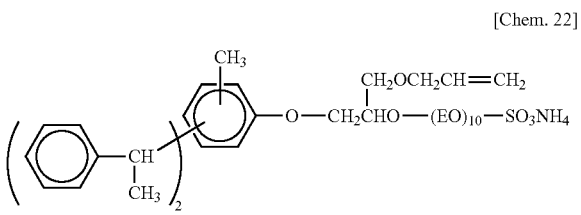

In addition, the structures of the comparative products used in the following experiments are as follows.

2. Preparation of Polymer Dispersion:

Experiment 1 (Examples 1-1 to 1-6 and Comparative Examples 1-1 to 1-4)

Preparation of Methyl Methacrylate/Butyl Acrylate-Based Polymer Dispersion

As monomers, 123.75 g of methyl methacrylate, 123.75 g of butyl acrylate, and 2.5 g of acrylic acid were blended; subsequently, prescribed amounts of the emulsifier that is the invention product or comparative product and polyfunctional monomers shown in Table 1 and 105 g of ion-exchanged water were added; and the contents were mixed using a homo-mixer, thereby preparing a mixed monomer emulsion liquid.

Subsequently, 122 g of ion-exchanged water and 0.25 g of sodium hydrogencarbonate were charged in a reactor provided with a stirrer, a reflux condenser, a thermometer, a nitrogen introducing pipe, and a dropping funnel; stirring was continued while ventilating nitrogen; 36 g of a part of the above-described previously prepared mixed monomer emulsion liquid was charged in the reactor; and the temperature

[Chem. 23]

Comparative Product [1]

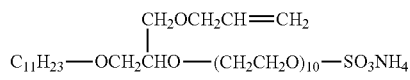

Comparative Product [2]

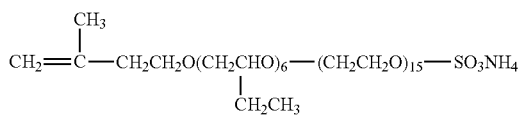

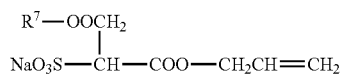

$R^7 = C_{12}H_{25}, C_{13}H_{27}$

Comparative Product [3]

Comparative Product [4]

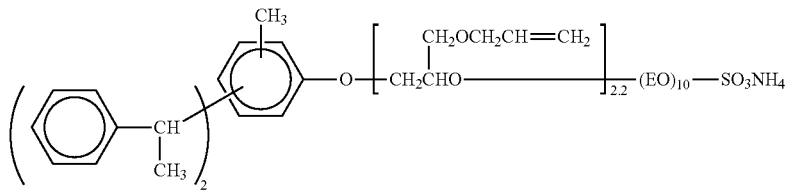

was increased to 80° C. Stirring was then continued for 15 minutes, a solution of 0.5 g of ammonium persulfate as a polymerization initiator in 20 g of ion-exchanged water was added, thereby initiating polymerization. Subsequently, 15 minutes after addition of the polymerization initiator, 324 parts of the residue of the mixed monomer emulsion liquid was dropped over 3 hours, thereby conducting polymerization. Furthermore, the resultant was continuously ripened for 2 hours and then cooled, followed by adjusting the pH to 8 with ammonia water. There were thus obtained polymer dispersions to be provided for evaluation experiments of the present invention.

Experiment 2 (Examples 2-1 to 2-3 and Comparative Examples 2-1 to 2-4)

Preparation of Styrene/Butyl Acrylate-Based Polymer Dispersion

In the above-described Experiment 1, methyl methacrylate and butyl acrylate that are the monomer components were changed to styrene and butyl acrylate, respectively, and emulsion polymerization with the emulsifier that is the invention product or comparative product shown in Table 2 was conducted in the same operations as those in the above-described Experiment 1. There were thus obtained polymer dispersions to be provided for evaluation experiments of the present invention.

Experiment 3 (Examples 3-1 to 3-5 and Comparative Examples 3-1 to 3-4)

Preparation of Vinyl Acetate/Butyl Acrylate-Based Polymer Dispersion

In the above-described Experiment 1, the monomer components were changed from methyl methacrylate and butyl acrylate to vinyl acetate and butyl acrylate, respectively, and emulsion polymerization with the emulsifier that is the invention product or comparative product shown in Table 3 was conducted in the same operations as those in the above-described Experiment 1. There were thus obtained polymer dispersions to be provided for evaluation experiments of the present invention.

Experiment 4 (Examples 4-1 to 4-3 and Comparative Examples 4-1 to 4-4)

Preparation of Styrene/Butadiene Polymer Dispersion

A pressure-resistant glass bottle, specifically an empty bottle for carbonated drink was used as a reactor; 60 g of ion-exchanged water was charged in this glass bottle; and dissolved oxygen was removed with a nitrogen gas. This glass bottle was cooled in an iced water bath; the emulsifier that is the invention product or comparative product and polyfunctional monomers shown in Table 4 were added; 0.12 g of a naphthalenesulfonic acid formalin condensate, 0.12 g of sodium carbonate, and 0.12 g of dodecyl mercaptan were added; and the glass bottle was temporarily plugged with a rubber stopper. This glass bottle was lightly manually shaken to make the contents uniform and then opened; 20 g of styrene and 0.12 g of potassium persulfate were charged; and the glass bottle was again temporarily plugged with a rubber stopper and allowed to stand for cooling in an iced water bath. Subsequently, butadiene was introduced from a butadiene cylinder into a graduated sample collecting tube in a methanol dry ice bath and liquefied. And 20 g of the liquefied butadiene was weighed out and charged in the glass bottle by using a stop cock-equipped syringe; and immediately after charging, a prescribed metal-made crown was covered and capped, thereby preparing a bottle polymerization reactor. Subsequently, the capped glass bottle was vigorously shaken, thereby making the content liquid in the glass bottle in an emulsified state. Subsequently, the glass bottle was set in a holder within a rotary polymerization tank for bottle polymerization adjusted at a water temperature of 50° C., polymerization was conducted for 20 hours at a rotation number of 50 rpm, thereby conducting emulsion polymerization by the bottle polymerization method. The glass bottle was then put in an iced water bath and cooled. Then, after opening the glass bottle, 0.12 g of p-tert-butyl catechol was added, and unreacted butadiene was vaporized and distilled off by means of bubbling of a nitrogen gas within a draft, thereby obtaining a polymer dispersion.

Experiment 5 (Examples 5-1 to 5-5 and Comparative Examples 5-1 to 5-5)

Preparation of Styrene/Butyl Acrylate-Based Polymer Dispersion

Monomers, namely 123.75 g of styrene, 123.75 g of butyl acrylate and 2.5 g of acrylic acid were mixed with 5.0 g of the emulsifier that is the invention product or comparative product and 105 g of ion-exchanged water by using a homomixer, thereby preparing a mixed monomer emulsion liquid. Separately from this, 122 g of ion-exchanged water and 0.25 g of sodium hydrogencarbonate were charged in a reactor provided with a stirrer, a reflux condenser, a thermometer, a nitrogen introducing pipe, and a dropping funnel. In the dropping funnel, 36 g of the above-described previously prepared mixed monomer emulsion liquid was charged and added batchwise in the reactor, and the temperature was then increased to 80° C. Stirring was then continued for 15 minutes, and a solution of 0.5 g of ammonium persulfate as a polymerization initiator in 20 g of ion-exchanged water was added, thereby initiating polymerization. Subsequently, 15 minutes after addition of the polymerization initiator, 324 g of the residue of the mixed monomer emulsion liquid was dropped over 3 hours, thereby conducting polymerization. Furthermore, the resultant was continuously ripened for 2 hours and then cooled, followed by adjusting the pH to 8 with ammonia water. There were thus obtained polymer dispersions to be provided for evaluation experiments of the present invention.

Experiment 6 (Examples 6-1 to 6-6 and Comparative Examples 6-1 to 6-4)

Preparation of 2-Ethylhexyl Acrylate/Butyl Acrylate-Based Polymer Dispersion

In the above-described Experiment 5, emulsion polymerization was conducted in the same operations as those in the above-described Experiment 5, except that styrene in the monomer components was changed to 2-ethylhexyl acrylate. There were thus obtained polymer dispersions to be provided for evaluation experiments of the present invention.

3. Evaluation Tests of Polymer Dispersion and Polymer Film:

The polymer dispersions and polymer films obtained in the respective Examples and Comparative Examples of the above-described Experiments 1 to 6 were subjected to the following evaluation tests. The results are shown in Tables 1 to 6, respectively.

(1) Evaluation of Polymer Dispersion:

A solid content, polymerization stability, an average particle size, foamability, mechanical stability, a rate of copolymerization of the reactive emulsifier, and filter filterability (however, only for the dispersions of the above-described Experiment 4) were measured or evaluated according to the following methods.

[Solid Content]

In an aluminum-made cup, 2 g of the polymer dispersion weighed was put, and after drying at 105° C. for 2 hours, a solid content mass was determined from a mass of the residue. The solid content mass was expressed in terms of % by mass relative to the weighed quantity of the polymer dispersion.

[Polymerization Stability]

Agglomerates produced during the emulsion polymerization process were filtered off from the polymer dispersion with an 80-mesh wire gauze, and the filtration residue was washed with water and then dried at 105° C. for 2 hours. The resulting mass was expressed in terms of % by mass relative to the solid content of the dispersion. Incidentally, in the present measurement, it is meant that the smaller the amount of agglomerates is, the higher the polymerization stability in the emulsion polymerization process is.

[Average Particle Size]

A part of the polymer dispersion was taken and measured with respect to its particle diameter by using a dynamic light scattering particle size distribution analyzer (a trade name: MICROTRAC UPA9340, manufactured by Nikkiso Co., Ltd.).

[Foamability]

With respect to foamability, the resultants of Experiments 1 to 4 were evaluated by following Method A and the resultants of Experiments 5 and 6 were evaluated by the following Method B, respectively.

Method A:

In a one-liter graduated cylinder, 100 mL of the polymer dispersion and 100 mL of water were taken; after controlling the temperature to 25° C., a nitrogen gas was ventilated at a rate of 300 mL/min for one minute through 502G•No. 2 (40 to 50 μm) of a Kinoshita glass ball filter; the ventilation of a nitrogen gas was then stopped; and immediately after stopping, a foam height (foam amount) was read as a "foam height (mL) immediately after stopping". In addition, 5 minutes after stopping of ventilation of a nitrogen gas, a foam height (foam amount) was read as a "foam height (mL) after 5 minutes", and "foam breaking properties (%)" were determined according to the following calculation equation. Incidentally, in that case, it is meant that the lower the "foam height (mL) immediately after stopping" is and the lower the "foam breaking properties (%)" are, the lower the foamability of the polymer dispersion is.

Foam breaking properties (%)=[{Foam height (mL) after 5 minutes}/{Foam height (mL) immediately after stopping}]×100

Method B:

The polymer dispersion was diluted two times with water; 30 mL of the diluted solution was put in a 100-mL Nessler tube; the Nessler tube was inverted 30 times and then allowed to stand for 5 minutes; and the foam amount (mL) was measured.

[Mechanical Stability]

By using a Maron tester, 50 g of the polymer dispersion weighed out was treated for 5 minutes at a load of 10 kg and a rotation number of 1,000 rpm; produced agglomerates were filtered off with a prescribed wire gauze (150 mesh in Experiments 1 to 4 and 80 mesh in Experiments 5 and 6, respectively); and the residue was washed with water and then dried at 105° C. for 2 hours. The resulting mass was expressed in terms of % by mass relative to the solid content of the dispersion. Incidentally, in the present measurement, it is meant that the smaller the amount of agglomerates is, the higher the stability of the polymer dispersion under a high shear condition is.

[Rate of Copolymerization of Reactive Emulsifier]

A fixed amount of the polymer dispersion was weighed out, to which was then added an excess of methanol. This methanol diluted solution was centrifuged and separated into a polymer and a supernatant. Subsequently, the supernatant was recovered and distilled under reduced pressure. The resulting residue was subjected to $^1$H-NMR measurement, thereby measuring a rate of copolymerization of the emulsifier.

[Filterability]

To evaluate filterability, 80 g of the resulting polymer dispersion was subjected to gravity filtration employing a 200-mesh wire gauze; a time required for the filtration was measured; and also, the status of an agglomerate residue remaining on the wire gauze was visually confirmed. The filterability was evaluated according to the following criteria. Incidentally, in the present measurement, it is meant that the shorter the filtration time is and the smaller the residue on the wire gauze is, the higher the polymerization stability in the emulsion polymerization process, the higher the yield in the commercial production, and the smaller the generation of a process trouble to be caused due to clogging of the filter.

A: The time required for the filtration is within 15 seconds, and a solid substance is not observed on the wire gauze.

B: Though the time required for the filtration is within 15 seconds, a solid residue is slightly observed on the wire gauze.

C: The time required for the filtration is more than 15 seconds and within 30 seconds, and a solid residue is observed on the wire gauze.

D: The time required for the filtration is more than 30 seconds, or clogging is observed, and a lot of solid residues are observed on the wire gauze.

(2) Evaluation of Polymer Film:

The resultants other than those of Experiment 4 were measured or evaluated with respect to water whitening resistance, peeling state, and water absorption according to the following methods.

[Water Whitening Resistance]

The polymer dispersion was applied on a commercially available glass plate in a film thickness of 120 μm (dry), dried for 24 hours in an atmosphere of 20° C.×65% RH, and then dipped in ion-exchanged water at 25° C.; the glass plate was placed on 16-point printed letters; and when the letters were allowed to look through the polymer film, the number of days until the letters could not be distinguished was measured.

[Peeling State]

In the above-described evaluation test of water whitening resistance, at a point of time when the 16-point letters were not seen, the state of the polymer film was visually observed and evaluated according to the following criteria.

A: The polymer film is not peeled off at all.

B: The circumference of the polymer film is slightly peeled off.

C: Almost all parts of the polymer film are peeled off from the glass.

D: The polymer film is completely peeled off from the glass.

[Water Absorption]

The resulting polymer dispersion was applied on a commercially available glass plate in a film thickness of 120 μm (dry) and dried for 24 hours in an atmosphere of 20° C.×65% RH; a polymer film was carefully peeled off from the glass plate; the resulting polymer film was cut into a size of 5 cm × 5 cm; and a mass (initial mass) of the polymer film was measured. Subsequently, this was dipped in ion-exchanged water at 25° C.; 24 hours after dipping, the polymer film was taken out from water; the moisture on the surface was lightly wiped off with a clean filter paper; amass (mass after dipping) of the polymer film was then measured; and a water absorption of the film was determined according to the following calculation equation.

Water absorption(% by mass)=[{(Mass of polymer film after dipping)−(Mass of polymer film before dipping)}/(Mass of polymer film before dipping)]×100  [Math. 1]

TABLE 1

| | | Example | | | | | | | Comparative Example | | | |
|---|---|---|---|---|---|---|---|---|---|---|---|---|
| Formulation/composition (charge unit (g)) | | 1-1 | 1-2 | 1-3 | 1-4 | 1-5 | 1-6 | 1-7 | 1-1 | 1-2 | 1-3 | 1-4 |
| Methyl methacrylate | | | | | | 123.75 | | | | | | |
| Butyl acrylate | | | | | | 123.75 | | | | | | |
| Acrylic acid | | | | | | 2.5 | | | | | | |
| Ammonium persulfate | | | | | | 0.5 | | | | | | |
| Sodium hydrogencarbonate | | | | | | 0.25 | | | | | | |
| Ion-exchanged water | | | | | | Balance *1 | | | | | | |
| [Emulsifier] | | | | | | | | | | | | |
| Compound [A2]/Compound [A3] = 50/50 (mass ratio) | | 5.0 | | | | | | | | | | |
| Compound [A3] | | | 5.0 | | | | 4.0 | | | | | |
| Compound [A5] | | | | 5.0 | | | | | | | | |
| Compound [A6] | | | | | 5.0 | | | | | | | |
| Compound [A7] | | | | | | 5.0 | | | | | | |
| Compound [A9] | | | | | | | | 5.0 | | | | |
| Comparative Product [1] | | | | | | | | | 5.0 | | | |
| Comparative Product [2] | | | | | | | | | | 5.0 | | |
| Comparative Product [3] (active component: 40%) | | | | | | | | | | | 12.5 | |
| Nonionic general-purpose emulsifier for emulsion polymerization *2 | | | | | | | 1.0 | | | | | |
| Anionic general-purpose emulsifier for emulsion polymerization *3 | | | | | | | | | | | | 5.0 |
| Total charge amount | | | | | | 500.0 | | | | | | |
| [Evaluation item] | | | | | | | | | | | | |
| Polymer dispersion | Solid content (% by mass) | 51.1 | 51.2 | 51.2 | 51.2 | 51.0 | 51.0 | 51.1 | 51.0 | 49.9 | 50.2 | 51.1 |
| | Polymerization stability (% by mass) | 0.05 | 0.05 | 0.06 | 0.08 | 0.09 | 0.03 | 0.04 | 0.07 | 0.22 | 0.10 | 0.82 |
| | Average particle size (μm) | 0.25 | 0.18 | 0.17 | 0.18 | 0.17 | 0.20 | 0.15 | 0.18 | 0.88 | 0.18 | 0.16 |
| Polymer film | Water Whitening Resistance (number of days) | >30 | >30 | >30 | >30 | >30 | >30 | 27 | 21 | 25 | 14 | 3 |
| | Peeling state | A | A | A | A | A | A | B | C | C | D | D |
| | Water absorption (% by mass) | 9.5 | 4.5 | 4.7 | 6.8 | 4.4 | 9.5 | 12.0 | 17.5 | 28.8 | 30.3 | 36.7 |

*1) Adjusted by the concentration of active component of emulsifier
*2) Polyoxyalkylene branched decyl ether (not having a reactive group, "NOIGEN XL-400", manufactured by Dai-ichi Kogyo Seiyaku Co., Ltd.)
*3) Polyoxyethylene lauryl ether ammonium sulfate (not having a reactive group, "HITENOL LA-12", manufactured by Dai-ichi Kogyo Seiyaku Co., Ltd.)

TABLE 2

| | Example | | | | Comparative Example | | | |
|---|---|---|---|---|---|---|---|---|
| Formulation/composition (charge unit (g)) | 2-1 | 2-2 | 2-3 | 2-4 | 2-1 | 2-2 | 2-3 | 2-4 |
| Styrene | | | | 123.75 | | | | |
| Butyl acrylate | | | | 123.75 | | | | |
| Acrylic acid | | | | 2.5 | | | | |
| Ammonium persulfate | | | | 0.5 | | | | |
| Sodium hydrogencarbonate | | | | 0.25 | | | | |
| Ion-exchanged water | | | | Balance *1 | | | | |
| [Emulsifier] | | | | | | | | |
| Compound [A3] | 5.0 | | | | | | | |
| Compound [A5] | | 5.0 | | | | | | |
| Compound [A6] | | | 5.0 | | | | | |
| Compound [A9] | | | | 5.0 | | | | |
| Comparative Product [1] | | | | | 5.0 | | | |

TABLE 2-continued

|  |  | Example | | | | Comparative Example | | | |
| --- | --- | --- | --- | --- | --- | --- | --- | --- | --- |
| Formulation/composition (charge unit (g)) | | 2-1 | 2-2 | 2-3 | 2-4 | 2-1 | 2-2 | 2-3 | 2-4 |
| Comparative Product [2] | | | | | | | 5.0 | | |
| Comparative Product [3] | | | | | | | | 5.0 | |
| Anionic general-purpose emulsifier for emulsion polymerization *2 | | | | | | | | | 5.0 |
| Total charge amount | | 500.0 | | | | | | | |
| [Evaluation item] | | | | | | | | | |
| Polymer dispersion | Solid content (% by mass) | 50.4 | 51.1 | 50.9 | 51.0 | 50.1 | 49.3 | 50.5 | 50.9 |
|  | Polymerization stability (% by mass) | 0.06 | 0.10 | 0.11 | 0.05 | 0.20 | 1.23 | 0.11 | 0.13 |
|  | Average particle size (μm) | 0.15 | 0.15 | 0.15 | 0.16 | 0.15 | 0.22 | 0.19 | 0.15 |
|  | Foamability: Foam height immediately after stopping (mL) | 205 | 215 | 210 | 200 | 345 | 255 | 355 | 330 |
|  | Foamability: Foam breaking properties (%) | 28 | 29 | 30 | 28 | 69 | 65 | 78 | 59 |
|  | Mechanical stability (% by mass) | <0.01 | 0.02 | 0.02 | 0.01 | 0.56 | 0.65 | 0.19 | 0.15 |
|  | Rate of copolymerization of emulsifier (%) | 88 | 84 | 85 | 80 | 45 | 33 | 31 | — |
| Polymer film | Water Whitening Resistance (number of days) | 18 | 17 | 16 | 12 | 5 | 4 | 3 | 1 |
|  | Peeling state | A | A | A | B | D | C | D | D |
|  | Water absorption (% by mass) | 5.3 | 5.2 | 5.4 | 10.0 | 18.3 | 19.5 | 20.3 | 36.0 |

*1) Adjusted by the concentration of active component of emulsifier
*2) Polyoxyethylene styrenated phenyl ether ammonium sulfate (not having a reactive group, "HITENOL NF-13", manufactured by Dai-ichi Kogyo Seiyaku Co., Ltd.)

TABLE 3

|  | Example | | | | | Comparative Example | | | |
| --- | --- | --- | --- | --- | --- | --- | --- | --- | --- |
| Formulation/composition (charge unit (g)) | 3-1 | 3-2 | 3-3 | 3-4 | 3-5 | 3-1 | 3-2 | 3-3 | 3-4 |
| Vinyl acetate | 187.5 | | | | | | | | |
| Butyl acrylate | 62.5 | | | | | | | | |
| Ammonium persulfate | 0.5 | | | | | | | | |
| Sodium hydrogencarbonate | 0.25 | | | | | | | | |
| Ion-exchanged water | Balance *1 | | | | | | | | |
| [Emulsifier] | | | | | | | | | |
| Compound [A1]/Compound [A3] = 50/50 (mass ratio) | 5.0 | | | | | | | | |
| Compound [A3] |  | 5.0 |  |  | 4.0 |  |  |  |  |
| Compound [A4] |  |  | 5.0 |  |  |  |  |  |  |
| Compound [A8] |  |  |  | 5.0 |  |  |  |  |  |
| Comparative Product [1] |  |  |  |  |  | 5.0 |  |  |  |
| Comparative Product [2] |  |  |  |  |  |  | 5.0 |  |  |
| Comparative Product [3] |  |  |  |  |  |  |  | 5.0 |  |
| Nonionic general-purpose emulsifier for emulsion polymerization *2 |  |  |  |  | 1.0 |  |  |  |  |
| Anionic general-purpose emulsifier for emulsion polymerization *3 |  |  |  |  |  |  |  |  | 5.0 |
| Total charge amount | 500.0 | | | | | | | | |
| [Evaluation item] | | | | | | | | | |
| Polymer dispersion Solid content (% by mass) | 50.8 | 51.0 | 50.9 | 50.7 | 50.6 | 50.1 | 48.5 | 50.9 | 51.0 |
| Polymerization stability (% by mass) | 0.04 | 0.06 | 0.09 | 0.05 | 0.08 | 0.18 | 0.94 | 0.38 | 0.06 |
| Average particle size (μm) | 0.27 | 0.16 | 0.18 | 0.16 | 0.20 | 0.17 | 0.28 | 0.19 | 0.16 |
| Foamability: Foam height immediately after stopping (mL) | 265 | 285 | 270 | 275 | 290 | 325 | 280 | 352 | 315 |
| Foamability: Foam breaking properties (%) | 31 | 32 | 35 | 31 | 31 | 68 | 57 | 73 | 65 |
| Mechanical stability (% by mass) | <0.01 | 0.01 | <0.01 | 0.05 | <0.01 | 0.03 | 0.12 | 0.38 | 0.02 |
| Rate of copolymerization of emulsifier (%) | 86 | 92 | 85 | 88 | 83 | 83 | 52 | 36 | — |
| Polymer film Water Whitening Resistance (number of days) | >30 | >30 | >30 | >30 | >30 | 3 | 3 | 5 | 1 |
| Peeling state | A | A | A | A | A | C | C | C | D |
| Water absorption (% by mass) | 14.7 | 17.5 | 15.5 | 16.1 | 15.4 | 30.4 | 33.8 | 37.0 | — |

*1) Adjusted by the concentration of active component of emulsifier
*2) Polyoxyalkylene branched decyl ether (not having a reactive group, "NOIGEN XL-400", manufactured by Dai-ichi Kogyo Seiyaku Co., Ltd.)
*3) Polyoxyethylene styrenated phenyl ether ammonium sulfate (not having a reactive group, "HITENOL NF-17", manufactured by Dai-ichi Kogyo Seiyaku Co., Ltd.)

TABLE 4

| Formulation/composition (charge unit (g)) | Example 4-1 | Example 4-2 | Example 4-3 | Comparative Example 4-1 | Comparative Example 4-2 | Comparative Example 4-3 | Comparative Example 4-4 |
|---|---|---|---|---|---|---|---|
| Styrene | | | | 20.0 | | | |
| Butadiene | | | | 20.0 | | | |
| Potassium persulfate | | | | 0.12 | | | |
| Sodium naphthalenesulfonate formalin condensate (active component: 40%) | | | | 0.30 | | | |
| Sodium carbonate | | | | 0.12 | | | |
| Dodecyl mercaptan | | | | 0.12 | | | |
| Ion-exchanged water | | | | Balance *1 | | | |
| p-tert-butyl catechol | | | | 0.12 | | | |
| [Emulsifier] | | | | | | | |
| Compound [A3] | 1.2 | | | | | | |
| Compound [A5] | | 1.2 | | | | | |
| Compound [A7] | | | 1.2 | | | | |
| Comparative Product [1] | | | | 1.2 | | | |
| Comparative Product [2] | | | | | 1.2 | | |
| Comparative Product [3] | | | | | | 1.2 | |
| Dodecyl diphenyl ether sodium disulfonate (active component: 50%) *2 | | | | | | | 2.4 |
| Total charge amount | | | | 100.0 | | | |
| [Evaluation item] | | | | | | | |
| Polymer dispersion — Solid content (% by mass) | 39.7 | 39.7 | 39.4 | 39.0 | 37.1 | 39.1 | 39.8 |
| Filter filterability | A | A | A | C | D | C | A |
| Foamability: Foam height immediately after stopping (mL) | 175 | 165 | 180 | 235 | 160 | 255 | 295 |
| Foamability: Foam breaking properties (%) | 32 | 30 | 40 | 65 | 50 | 68 | 75 |
| Mechanical stability (% by mass) | <0.01 | 0.02 | 0.02 | 0.54 | 1.44 | 0.22 | 0.04 |
| Rate of copolymerization of emulsifier (%) | 82 | 81 | 78 | 55 | 32 | 33 | — |

*1) Adjusted by the concentration of active component of emulsifier
*2) Nonreactive emulsifier

TABLE 5

| Formulation/composition (charge unit (g)) | Example 5-1 | Example 5-2 | Example 5-3 | Example 5-4 | Example 5-5 | Comparative Example 5-1 | Comparative Example 5-2 | Comparative Example 5-3 | Comparative Example 5-4 | Comparative Example 5-5 |
|---|---|---|---|---|---|---|---|---|---|---|
| Styrene | | | | | | 123.75 | | | | |
| Butyl acrylate | | | | | | 123.75 | | | | |
| Acrylic acid | | | | | | 2.5 | | | | |
| Ammonium persulfate | | | | | | 0.5 | | | | |
| Sodium hydrogencarbonate | | | | | | 0.25 | | | | |
| Ion-exchanged water | | | | | | Balance *1 | | | | |
| [Emulsifier] | | | | | | | | | | |
| Compound [B3] | 5.0 | | | | | | | | | |
| Compound [B4] | | 5.0 | | | | | | | | |
| Compound [B6] | | | 5.0 | | | | | | | |
| Compound [B7] | | | | 5.0 | | | | | | |
| Compound [B8] | | | | | 5.0 | | | | | |
| Comparative Product [1] | | | | | | 5.0 | | | | |
| Comparative Product [2] | | | | | | | 5.0 | | | |
| Comparative Product [3] | | | | | | | | 5.0 | | |
| Comparative Product [4] | | | | | | | | | 5.0 | |
| Anionic general-purpose emulsifier for emulsion polymerization *2 | | | | | | | | | | 5.0 |
| Total charge amount | | | | | | 500.0 | | | | |
| [Evaluation item] | | | | | | | | | | |
| Polymer dispersion — Solid content (% by mass) | 50.8 | 51.0 | 50.6 | 50.7 | 50.5 | 50.1 | 49.3 | 50.5 | 50.7 | 50.9 |
| Polymerization stability (% by mass) | 0.04 | 0.11 | 0.07 | 0.05 | 0.06 | 0.20 | 1.23 | 0.11 | 0.20 | 0.13 |
| Average particle size (μm) | 0.14 | 0.16 | 0.15 | 0.15 | 0.16 | 0.15 | 0.22 | 0.19 | 0.18 | 0.15 |
| Foamability (mL) | 203 | 210 | 208 | 202 | 211 | 345 | 255 | 355 | 215 | 330 |
| Mechanical stability (% by mass) | <0.01 | 0.03 | 0.02 | 0.01 | 0.02 | 0.56 | 0.65 | 0.19 | 0.25 | 0.15 |
| Rate of copolymerization of emulsifier (%) | 87 | 85 | 88 | 84 | 87 | 45 | 33 | 31 | 85 | — |
| Polymer film — Water Whitening Resistance (number of days) | 16 | 15 | 18 | 17 | 12 | 5 | 4 | 3 | 9 | 1 |

TABLE 5-continued

|  | Example | | | | | Comparative Example | | | | |
|---|---|---|---|---|---|---|---|---|---|---|
| Formulation/composition (charge unit (g)) | 5-1 | 5-2 | 5-3 | 5-4 | 5-5 | 5-1 | 5-2 | 5-3 | 5-4 | 5-5 |
| Peeling state | A | A | A | A | A | D | C | D | C | D |
| Water absorption (% by mass) | 5.2 | 5.7 | 5.4 | 5.3 | 8.0 | 18.3 | 19.5 | 20.3 | 19.0 | 36.0 |

*1) Adjusted by the concentration of active component of emulsifier
*2) Polyoxyethylene styrenated phenyl ether ammonium sulfate (not having a reactive group, "HITENOL NF-13", manufactured by Dai-ichi Kogyo Seiyaku Co., Ltd.)

TABLE 6

|  |  | Example | | | | | | Comparative Example | | | |
|---|---|---|---|---|---|---|---|---|---|---|---|
| Formulation/composition (charge unit (g)) | | 6-1 | 6-2 | 6-3 | 6-4 | 6-5 | 6-6 | 6-1 | 6-2 | 6-3 | 6-4 |
| Methyl methacrylate | | | | | | 123.75 | | | | | |
| Butyl acrylate | | | | | | 123.75 | | | | | |
| Acrylic acid | | | | | | 2.5 | | | | | |
| Ammonium persulfate | | | | | | 0.5 | | | | | |
| Sodium hydrogencarbonate | | | | | | 0.25 | | | | | |
| Ion-exchanged water | | | | | | Balance *1 | | | | | |
| [Emulsifier] | | | | | | | | | | | |
| Compound [B1]/Compound [B3] = 50/50 (mass ratio) | | 5.0 | | | | | | | | | |
| Compound [B2]/Compound [B3] = 50/50 (mass ratio) | | | 5.0 | | | | | | | | |
| Compound [B3] | | | | 5.0 | | | 4.0 | | | | |
| Compound [B4] | | | | | 5.0 | | | | | | |
| Compound [B5] | | | | | | 5.0 | | | | | |
| Comparative Product [1] | | | | | | | | 5.0 | | | |
| Comparative Product [2] | | | | | | | | | 5.0 | | |
| Comparative Product [3] (active component: 40%) | | | | | | | | | | | 12.5 |
| Nonionic general-purpose emulsifier for emulsion polymerization *2 | | | | | | | 1.0 | | | | |
| Anionic general-purpose emulsifier for emulsion polymerization *3 | | | | | | | | | | | 5.0 |
| Total charge amount | | | | | | 500.0 | | | | | |
| [Evaluation item] | | | | | | | | | | | |
| Polymer dispersion | Solid content (% by mass) | 51.0 | 51.2 | 51.1 | 51.2 | 51.0 | 51.1 | 51.0 | 49.9 | 50.2 | 51.1 |
|  | Polymerization stability (% by mass) | 0.09 | 0.08 | <0.01 | 0.03 | 0.06 | 0.05 | 0.07 | 0.22 | 0.10 | 0.82 |
|  | Average particle size (μm) | 0.23 | 0.20 | 0.16 | 0.15 | 0.17 | 0.15 | 0.18 | 0.88 | 0.18 | 0.16 |
| Polymer film | Water Whitening Resistance (number of days) | >30 | >30 | >30 | >30 | >30 | >30 | 21 | 25 | 14 | 3 |
|  | Peeling state | A | A | A | A | A | A | C | C | D | D |
|  | Water absorption (% by mass) | 7.2 | 7.6 | 5.3 | 5.0 | 6.2 | 4.7 | 17.5 | 28.8 | 30.3 | 36.7 |

*1) Adjusted by the concentration of active component of emulsifier
*2) Polyoxyalkylene branched decyl ether (not having a reactive group, "NOIGEN XL-400", manufactured by Dai-ichi Kogyo Seiyaku Co., Ltd.)
*3) Polyoxyethylene lauryl ether ammonium sulfate (not having a reactive group, "HITENOL LA-12", manufactured by Dai-ichi Kogyo Seiyaku Co., Ltd.)

INDUSTRIAL APPLICABILITY

The polymer dispersion obtained by adding the emulsifier for emulsion polymerization can be applied as, for example, an adhesive, a bonding agent, a coating agent, an impregnation reinforcing agent, or the like to resins, metals, papers, woods, and cloths, and besides, concretes, and the like. In addition, the polymer dispersion or the solid polymer taken out from the polymer dispersion can be used for a modifier of resins, rubbers, or polymers.

The invention claimed is:
1. An emulsifier for emulsion polymerization comprising a compound represented by the following general formula (I):

[Chem. 1]

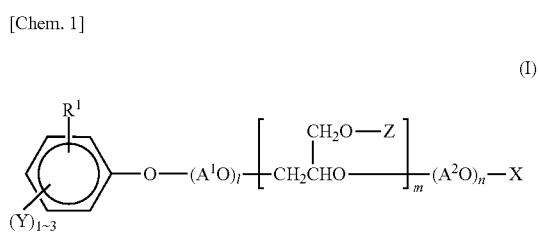

(I)

$X = H$, $-(CH_2)_a-SO_3M$, $-(CH_2)_b-COOM$, $-PO_3M_2$, $-P(B)O_2M$, or $-CO-CH_2-CH(SO_3M)-COOM$

Y=

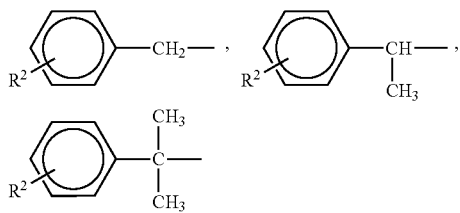

Z=

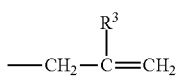

wherein in the general formula (I), $R^1$ represents an alkyl group having from 1 to 4 carbon atoms or a hydrogen atom;

X represents a hydrogen atom or a group selected from anionic hydrophilic groups represented by the foregoing structural formulae, in these structural formulae, each of a and b represents a number of from 0 to 4, B represents a residue resulting from eliminating X from the general formula (I), and each M represents a hydrogen atom, an alkali metal atom, an alkaline earth metal atom, an ammonium group, or an alkanolamine residue;

Y represents a group selected from substituents represented by the foregoing structural formulae, a substitution number of which is any one of from 1 to 3, and in the structural formulae representing these substituents, $R^2$ represents a hydrogen atom or a methyl group;

Z represents a polymerizable unsaturated group represented by the foregoing structural formula, and in the structural formula representing this unsaturated group, $R^3$ represents a hydrogen atom or a methyl group;

each of $A^1$ and $A^2$ represents an alkylene group or a substituted alkylene group each having from 2 to 4 carbon atoms, or a residue derived from an alkyl glycidyl ether or an alkenyl glycidyl ether each having from 4 to 22 carbon atoms; and l represents a number in the range of from 0 to 5 as an average addition molar number of $A^1O$; m represents a number in the range of from 1.2 to 1.5; and n represents a number in the range of from 0 to 100 as an average addition molar number of $A^2O$.

2. The emulsifier for emulsion polymerization according to claim 1, comprising a compound represented by the general formula (I), wherein X is —$SO_3M$; l is 0; $A^2$ represents an ethylene group; and n represents a number in the range of from 1 to 50.

3. The emulsifier for emulsion polymerization according to claim 1, comprising a compound represented by the general formula (I), wherein X is —$SO_3M$, $A^1$ represents a residue derived from an alkyl glycidyl ether represented by the following general formula (II); l represents a number in the range of from 1 to 2; $R^4$ represents a hydrocarbon group having from 6 to 19 carbon atoms; $A^2$ is an ethylene group; and n represents a number in the range of from 1 to 50:

[Chem. 2]

(II)

4. An emulsion polymerization method comprising polymerizing at least one polymerizable unsaturated monomer including styrene by using the emulsifier for emulsion polymerization according to claim 1.

5. An emulsion polymerization method comprising polymerizing at least one polymerizable unsaturated monomer including styrene by using the emulsifier for emulsion polymerization according to claim 2.

6. An emulsion polymerization method comprising polymerizing at least one polymerizable unsaturated monomer including styrene by using the emulsifier for emulsion polymerization according to claim 3.

* * * * *